Figure 7:
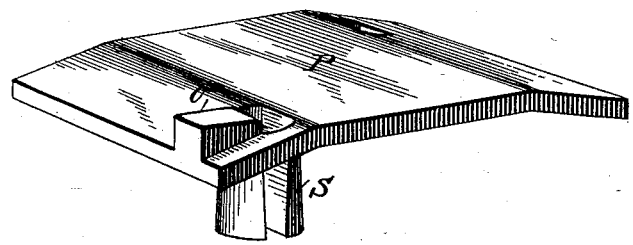

(No Model.) 3 Sheets—Sheet 1.
A. B. B. HARRIS.
GAGE ADJUSTING TIE PLATE.
No. 603,563. Patented May 3, 1898.
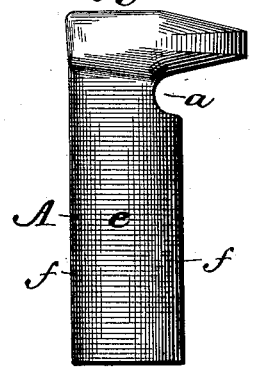
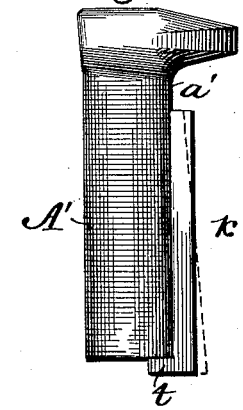
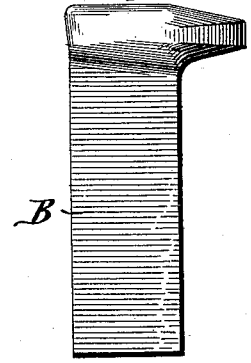
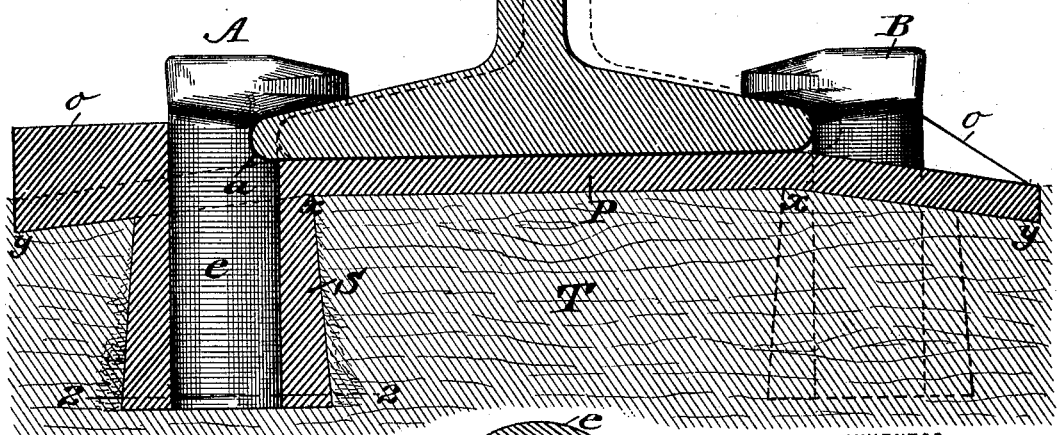
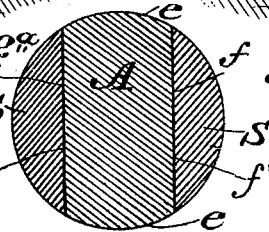
WITNESSES:
M. S. Bloudel.
Edw. W. Byrn.
INVENTOR
A. B. B. Harris.
BY Munn & Co.
ATTORNEYS.

(No Model.) 3 Sheets—Sheet 2.
A. B. B. HARRIS.
GAGE ADJUSTING TIE PLATE.
No. 603,563. Patented May 3, 1898.
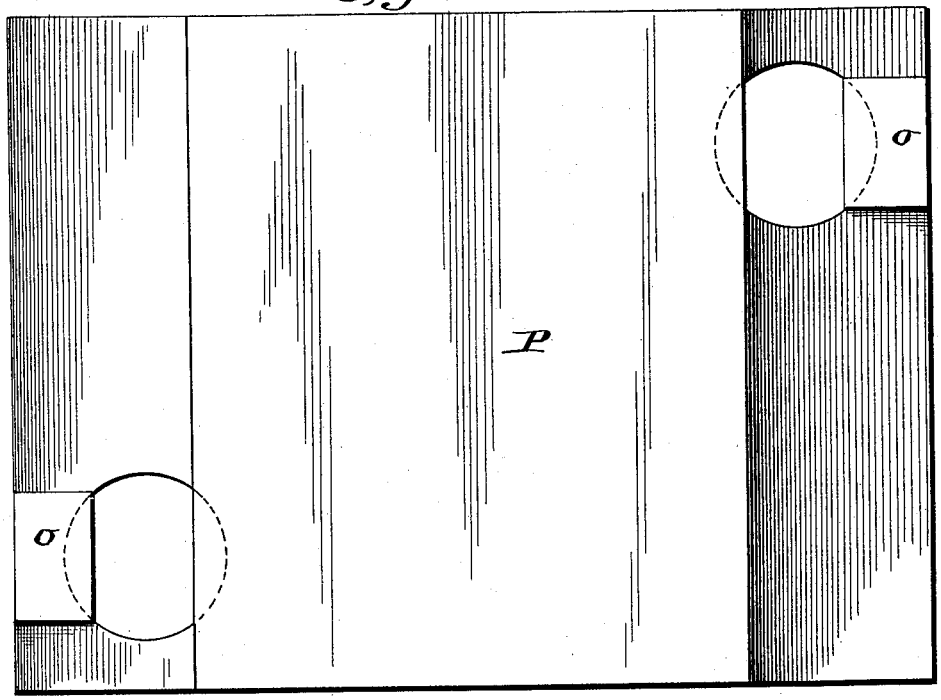
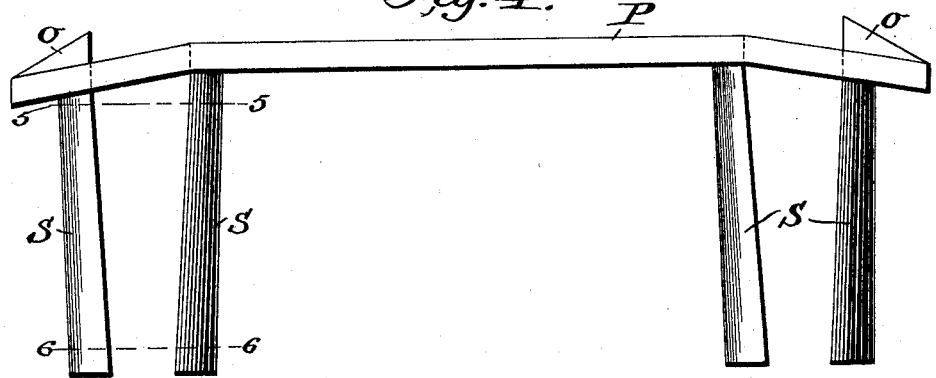
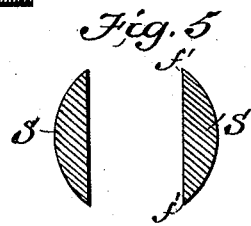
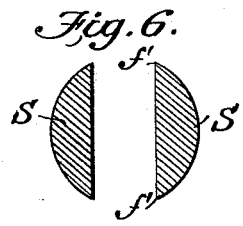
WITNESSES:
M. D. Bloudel
Edw. W. Byrn.
INVENTOR
A. B. B. Harris.
BY Munn & Co.
ATTORNEYS.

(No Model.)  A. B. B. HARRIS.  3 Sheets—Sheet 3.
GAGE ADJUSTING TIE PLATE.

No. 603,563. Patented May 3, 1898.

WITNESSES:
M. D. Blondel
Edw. W. Byrn.

INVENTOR
A. B. B. Harris.
BY Munn & Co.
ATTORNEYS.

UNITED STATES PATENT OFFICE.

ALEXANDER B. B. HARRIS, OF BRISTOL, TENNESSEE.

GAGE-ADJUSTING TIE-PLATE.

SPECIFICATION forming part of Letters Patent No. 603,563, dated May 3, 1898.

Application filed July 24, 1897. Serial No. 645,763. (No model.)

*To all whom it may concern:*

Be it known that I, ALEXANDER B. B. HARRIS, of Bristol, in the county of Sullivan and State of Tennessee, have invented a new and useful Improvement in Gage-Adjusting Tie-Plates, of which the following is a specification.

My invention is in the nature of an improvement upon the railroad-tie plate shown and described in my Patent No. 560,497, granted May 19, 1896; and it consists in such features of construction and arrangement of the plates and spikes as will permit the railroad-rails to be adjusted laterally to correct any deviation from the proper and standard gage, and also in an improved construction of the plate.

In my patent referred to the tie-plate was provided on its under side with thimbles split longitudinally into four sections, forming spike-sockets which were integral with the plate, two sections being thicker at their lower ends, so that when such split thimbles were inserted in holes bored in the cross-ties and the spikes were driven through the thimbles the lower ends of the thimble-section which laid in the direction of the grain of the wood were expanded and made to clench or bind on the ties, so as to rigidly hold the tie-plates from either lifting up or moving laterally. With such a construction it is obvious that the rail, spikes, tie-plates, and tie are all rigidly locked together and are not susceptible of adjustment—that is to say, if the head of the rail should become ground off and worn away on the inside from the abrasion of the flange of the car-wheel, as always takes place on curves, the distance between the heads of the two rails is increased and the gage is changed. My invention is designed to provide for this by a readjustment of the rail to compensate for this wear, so as to restore the gage to the standard width and without sacrificing in any way any of the desirable features of my tie-plate or involving any extra expense.

To this end it consists in making the spikes of two different patterns, one with a straight shank up to its head, as in my former patent, and the other with a recess just under the head on the side next to the rail-base and arranging these two spikes on opposite sides of the rail interchangeably, so as to permit of the lateral readjustment of the rail when necessary.

The improvements in the plate comprise features designed to cheapen and facilitate its manufacture and to keep dirt and water from getting under it and between it and the rail, as will be hereinafter more fully described with reference to the drawings, in which—

Figure 8:
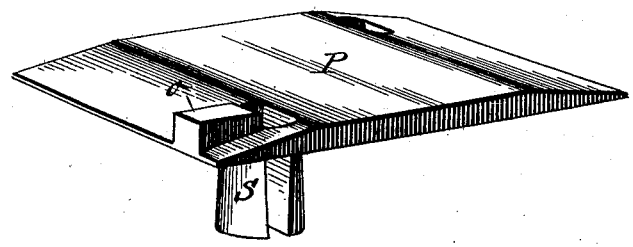
Figure 9:
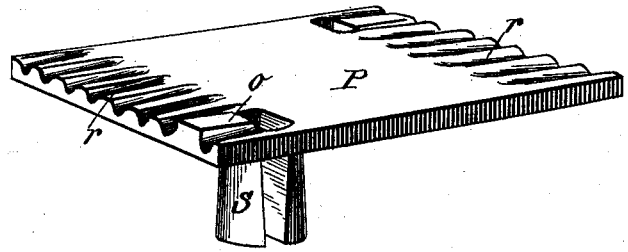

Figure 1 is a side view of my new form of spike. Fig. 1ª is a side view of a modification of my new form of spike. Fig. 2 is a cross-section taken through the rail and tie-plate as applied to the tie in accordance with my invention. Fig. 2ª is a cross-section on line 2 2 of Fig. 2. Fig. 3 is a top plan view of the plate; Fig. 4, a side view of the same. Figs. 5 and 6 are sections through lines 5 5 and 6 6, respectively, of Fig. 4. Figs. 7, 8, and 9 are views in perspective showing modifications of the plate, and Fig. 10 is my old form of spike.

Referring to Fig. 2, R is the rail, T is the cross-tie, and P the tie-plate which connects the rail to the cross-tie and forms a base upon which the rail lies flat.

The tie-plate in my previous patent has cast, forged, or otherwise formed upon its lower side, so as to be integral therewith, the spike-sockets, which are cylindrical thimbles split longitudinally into four sections, of which those that lie in the direction of the grain of the wood in the tie are made thicker at their lower ends, so that when a hole is bored in the tie to receive this cylindrical spike-socket and the latter is inserted in the hole and a spike is driven down through it the lower and thicker ends of the socket-sections are pressed outwardly in the direction of the grain of the wood and are made to clench in the wood of the tie.

In my present invention, Figs. 1 and 2ª, I make the spike with two round edges $e\ e$ and two flat sides $f\ f$. I dispense with two of the socket-sections and merely use the two tongues S S, which are thickest at their lower ends and lie in the direction of the grain of the wood, as shown in Figs. 4, 5, and 6. The advantage of this form is that it can be more easily manufactured, and when the spikes are driven the bored hole in the tie is entirely filled with the tongues S S and spike, Fig. 2ª, and there are no slots or cracks left to receive water and rot out the tie. The outer circle of the tongues, close up under the plate, Fig. 5, is made to fit a one and one-fourth inch hole, and the space between them is three-fourths of an inch, or just equal to the thickness of the spike. The lower ends of the tongues are thicker (see Fig. 6) and the space between them is less than the thickness of the spike; but the inner faces $f'\,f'$ at both the top and bottom of the tongues are just equal to the flat sides $f\,f$ of the spike, so that when the lower ends are forced out the bored hole is completely and solidly filled, as before stated, and shown in Fig. 2ª. I also form the spike A with a recess $a$, Fig. 1, which reduces the thickness of the spike close up under its head on the side which is to overlap the rail-base, and this spike A, I use in connection with the old form of spike B, Fig. 10, described in my former patent. Both these spikes are merely expanding plugs and do not penetrate or come in contact with the wood of the tie, and hence need not be sharpened.

In securing the rail to the tie the tie-plate is adjusted so that its spike-sockets enter the bored holes in the tie, and one of my spikes A is driven in the spike-socket on the outside of the track. The rail R is then laid on the plate and is slipped laterally, so that the edge of the rail-base enters the little recess $a$ in the spike A. The other and plain spike B is then driven down.

Now if the inner side of the rail-head (or the right side of Fig. 2) becomes worn away by the flange of the car-wheel and the gage is thus widened all that is necessary to do is to take out the spikes A and B and have them change places. This, it will be seen, allows the rail to be shifted to the right, as shown in dotted lines, and this corrects the deviation in gage without any extra parts or extra expense and without in the least impairing the anchorage of the tie-plate in the tie.

In Fig. 1ª I show a modification of the spike, in which a gib or key $k$ is used which is made shorter than the spike A', so as to leave a space $a'$ corresponding to recess $a$, and the gib or key has a toe $t$ underlapping the spike end. If the wood of the tie be old and has lost its pinch or grip on the exterior of the tongues S, these latter may be tightened to a new hold in a very simple and practical way by this modification. In such case the gib or key $k$ is made thicker at the bottom than it is at the top, as indicated in dotted lines in Fig. 1ª, and this gib or key is inserted in the socket between the tongues S before the spike is driven. This not only holds the rail in the same manner as before described, but further expands the tongues of the spike-socket and tightens up the latter in the wood of the tie. The object of the toe $t$ on the key $k$ is to prevent the key from being driven into the wood and also prevents the closing up of the recess $a'$ at the top when the spike is driven to its lowest position even if the rail-base be not in the recess $a'$.

In constructing the plate P that part of it from the rail-base outwardly is made with a downward dip or inclination from $x$ to $y$. The object of this form is threefold: First, it prevents dirt, sand, or water from getting between the rail and plate. It can readily be seen that sand or dirt falling on the incline surface will be washed away from the rail. This will assist in preventing the wear between rail and plate. Second, it will keep the plate from cupping up along the edge of the railing. Third, the under inclined surface will prevent water from getting under the plate or between the plate and tie. On the upper surface of the part $x\,y$ are lugs $o$, which are immediately opposite to the spike-holes and are intended to brace the spikes. They may have either a flat horizontal top, as on the left of Fig. 2, or be inclined, as on the right. These lugs should extend slightly above the level of the middle of the plate, so as to better resist the lateral thrust of the base of the rail. These brace-lugs are only needed on the outside of the rail and for the most part will be so used, as shown in Figs. 7, 8, and 9. These plates may also be perfectly flat on the under side and beveled on the upper side, as in Fig. 8, or they may be flat on both top and bottom sides and have a series of inclined grooves or ribs $r$, as in Fig. 9, to drain water, sand, &c., away from the base of the rail.

Having thus described my invention, what I claim as new, and desire to secure by Letters Patent, is—

1. A spike of substantially uniform transverse dimensions having beneath its head a recess reducing the thickness of the spike substantially as and for the purpose described.

2. A spike of substantially uniform transverse dimensions having a recess under its head formed by a detachable gib or key $k$ having a flange or toe $t$ at its lower end substantially as and for the purpose described.

3. A rail and tie fastening, comprising a tie-plate having on its under side integral spike-tongues as described and two expanding-plug spikes, one having a straight shank, and the other having a recess just beneath its head that reduces the thickness of the spike, said two spikes being arranged to go upon opposite sides of the rail and to be interchangeable to correct the gage of the rail substantially as and for the purpose described.

4. The combination of a spike having two circular edges and two alternating flat sides, and a tie-plate having on opposite sides of its spike-holes two downwardly-extending tongues, thicker at their lower ends than they are at their upper ends, and having their inner faces flat and corresponding to the flat faces of the spike, to completely fill a bored hole in the tie substantially as described.

5. A railroad-tie plate having a flat horizontal middle portion beneath the rail, and downwardly-inclined side portions with spike-braces o on their upper surfaces, and spike-tongues on the under side at the junction of the horizontal and inclined portions substantially as and for the purpose described.

ALEXANDER B. B. HARRIS.

Witnesses:
H. W. TAYLOR,
C. L. BUNTING.